(12) United States Patent
Bradfield

(10) Patent No.: US 8,339,000 B2
(45) Date of Patent: Dec. 25, 2012

(54) ELECTRIC MACHINE WITH ISOLATED GROUND ELECTRONICS

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 395 days.

(21) Appl. No.: 12/691,082

(22) Filed: Jan. 21, 2010

(65) Prior Publication Data

US 2011/0175495 A1 Jul. 21, 2011

(51) Int. Cl.
*H02K 11/00* (2006.01)

(52) U.S. Cl. .......................................... 310/68 D; 310/71

(58) Field of Classification Search ............... 310/68 D, 310/67 R, 68 R, 68 A, 68 B, 68 C, 71
See application file for complete search history.

(56) References Cited

U.S. PATENT DOCUMENTS

| | | | |
|---|---|---|---|
| 4,606,000 A | 8/1986 | Steele et al. | |
| 5,659,212 A | 8/1997 | DePetris | |
| 6,476,527 B2 | 11/2002 | Ballard et al. | |
| 6,528,911 B1 | 3/2003 | De Petris | |
| 6,731,030 B2 | 5/2004 | Keidar et al. | |
| 6,864,603 B2 * | 3/2005 | Yamazaki et al. | 310/53 |
| 6,911,750 B2 | 6/2005 | Bradfield et al. | |
| 7,282,825 B2 | 10/2007 | Sakakibara | |
| 7,352,091 B2 | 4/2008 | Bradfield | |
| 8,106,547 B2 * | 1/2012 | Inokuchi et al. | 310/68 D |
| 2005/0001492 A1 | 1/2005 | Bradfield et al. | |
| 2005/0006975 A1 | 1/2005 | Bradfield et al. | |
| 2005/0082922 A1* | 4/2005 | Armiroli et al. | 310/68 D |
| 2005/0194850 A1 | 9/2005 | Bradfield et al. | |
| 2006/0043805 A1 | 3/2006 | Bradfield | |
| 2006/0110987 A1 | 5/2006 | Schwartz et al. | |
| 2006/0232151 A1* | 10/2006 | DuBois | 310/68 D |
| 2007/0210662 A1 | 9/2007 | Bradfield | |

* cited by examiner

*Primary Examiner* — Nguyen N Hanh
(74) *Attorney, Agent, or Firm* — Maginot, Moore & Beck

(57) ABSTRACT

An electrical system for a vehicle comprises a battery including a positive terminal and a negative terminal, and an alternator. The alternator includes a metal housing with a rotor and a stator positioned within the housing. The alternator further includes an electronics package positioned on the alternator housing. The electronics package includes a regulator and a rectifier, the rectifier including a plurality of negative diodes and a plurality of positive diodes. The plurality of positive diodes are positioned on a first diode carrier that is electrically connected to the negative terminal of the battery. The plurality of positive diodes are positioned on a second diode carrier that is electrically connected to the positive terminal of the battery. The first diode carrier is separated from the housing by an electrical insulation member positioned between the first diode carrier and the housing.

19 Claims, 8 Drawing Sheets

ELECTRIC MACHINE WITH ISOLATED GROUND ELECTRONICS

FIELD

This application relates to the field of electric machines, and more particularly to dynamoelectric machines having electronic component packages mounted to the electric machine.

BACKGROUND

The increasing power density of vehicle dynamoelectric machines has resulted in some electric machines that use the housing of the machine as a heat sink for electronic components and circuits. Because of the increasing number of electronic components and circuits in modern vehicles, in some situations there may also be a desire to isolate electrical systems in order to reduce disruptive currents and electromagnetic interference (EMI) between components and circuits.

Vehicle alternators produce three-phase alternating current that is rectified into a direct current. The associated voltage can be stored in a battery of a vehicle or be used directly by the electrical circuit of the vehicle, which is supplied with a direct current (DC) voltage. Rectification of the three-phase alternating current is generally obtained by means of a rectifier bridge having six power diodes. Three of these diodes are the positive diodes, and these positive diodes are connected between the phase terminals of the stator windings of the alternator and the positive terminal B+ of the alternator which is connected to the battery and the electrical circuit of the vehicle. Three further diodes, namely the negative diodes, are connected between electrical ground or earth of the vehicle and the aforementioned phase terminals of the stator windings.

The positive and negative diodes make up a rectifier bridge that is subjected to high current. Hence, it is necessary to cool the diodes in the most effective way possible. To this end, the diodes are commonly mounted on metal plates arranged on the outside of the alternator. The metal plates not only serve as mounting plates, but also serve as a heat sink designed to dissipate heat produced by the diodes. The diodes are typically grouped on two carrier plates, one of which is reserved for the positive diodes, and the other for the negative diodes. The rectifier diodes are inserted by pressure in receiving bore holes of the carrier plate/heat sink, or are soldered to the carrier plate using appropriate solder alloys. The end wires connected to the rectifier diodes enable the rectifier diodes to be connected to external sources.

In such an alternator arrangement where the rectifier bridge is mounted on carrier plates, the negative diodes of the system are connected to vehicle ground/battery return path. The vehicle ground/battery return path is often provided by the engine itself, including the alternator housing. However, in some vehicle designs, current flow through the engine can create problems with the engine's electronic control module (ECM) and/or other electronics packages. For example, current through the return path may result in electromagnetic interference (EMI) that disrupts the operation the ECM.

In view of the foregoing, it would be desirable to provide an alternator arrangement where disruptive return path current flows are avoided. It would also be desirable if the size of the alternator remains relatively small in order to avoid overcrowding in the engine compartment.

SUMMARY

In accordance with one embodiment of the disclosure, there is provided an electric machine comprising a rotor and a stator positioned within a housing. The electric machine further comprises a rectifier including a plurality of positive diodes and a plurality of negative diodes. The negative diodes are mounted on a first electrically conductive carrier. An insulative separator is positioned between the first electrically conductive carrier and the housing. The positive diodes are mounted on a second electrically conductive carrier.

Pursuant to another embodiment of the disclosure, there is provided a vehicle electrical system comprising a dynamoelectric machine including a housing. The vehicle electrical system further comprises a first heat sink with a first plurality of diodes connected to the first heat sink. A first electrical insulation member is positioned between the first heat sink and the housing. The vehicle electrical system further comprises a second heat sink with a second plurality of diodes connected to the second heat sink. A second electrical insulation member is positioned between the first heat sink and the second heat sink.

In accordance with yet another embodiment of the disclosure, there is provided a vehicle comprising an engine, a battery including a positive terminal and a negative terminal, and an alternator. The alternator includes a metal housing, a rotor and a stator positioned within the housing, the rotor configured to rotate upon operation of the engine. The alternator further includes an electronics package positioned on the housing. The electronics package comprises a regulator and a rectifier, the rectifier including a plurality of negative diodes and a plurality of positive diodes. The plurality of positive diodes are positioned on a first diode carrier that is electrically connected to the negative terminal of the battery. The plurality of positive diodes are positioned on a second diode carrier that is electrically connected to the positive terminal of the battery. The first diode carrier is separated from the housing by an electrical insulation member positioned between the first diode carrier and the housing.

The above described features and advantages, as well as others, will become more readily apparent to those of ordinary skill in the art by reference to the following detailed description and accompanying drawings. While it would be desirable to provide an electric machine that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
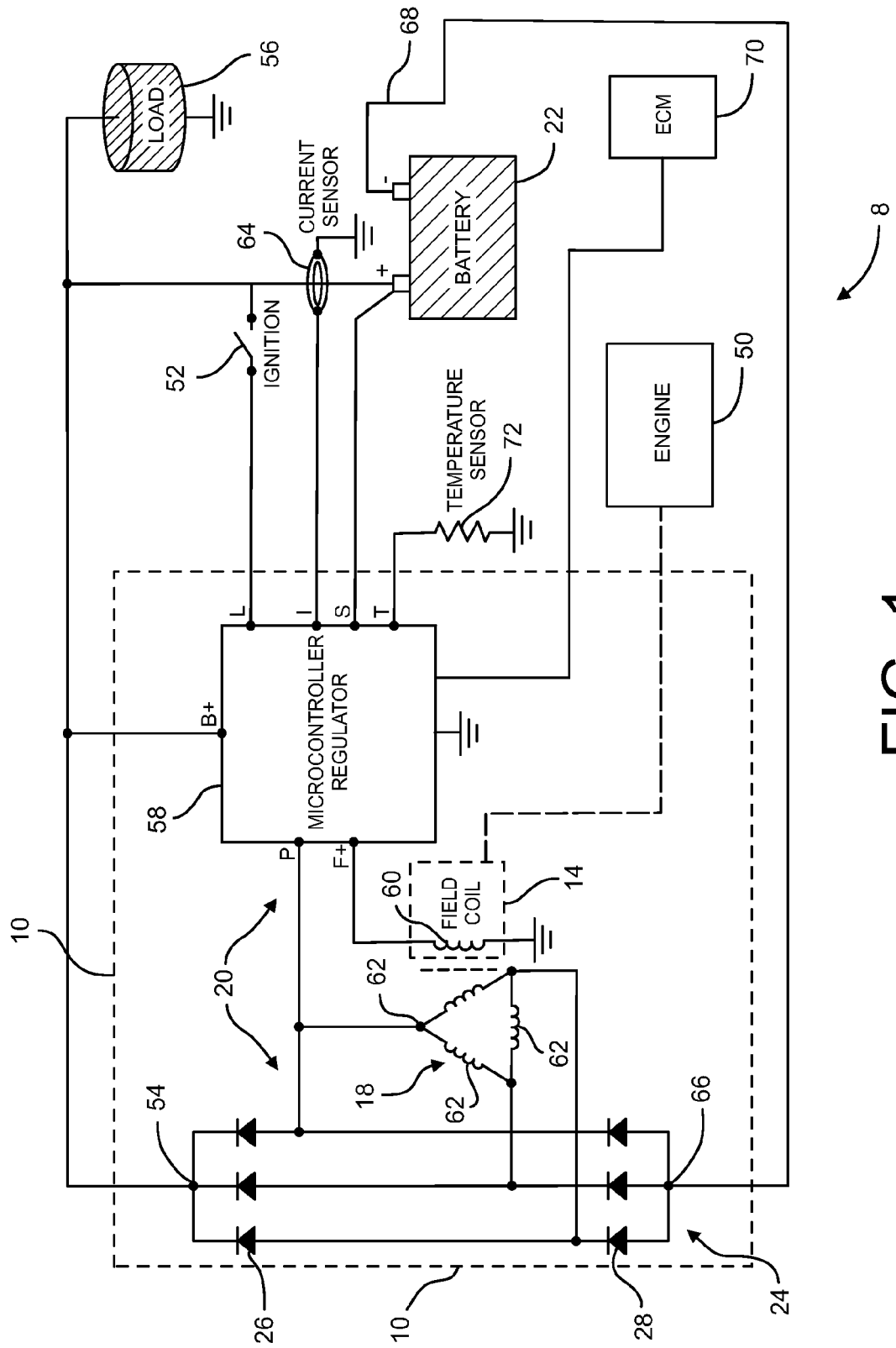
FIG. 1 shows schematic diagram of a vehicle electrical system including an electric machine with isolated ground electronics.
Figure 2:
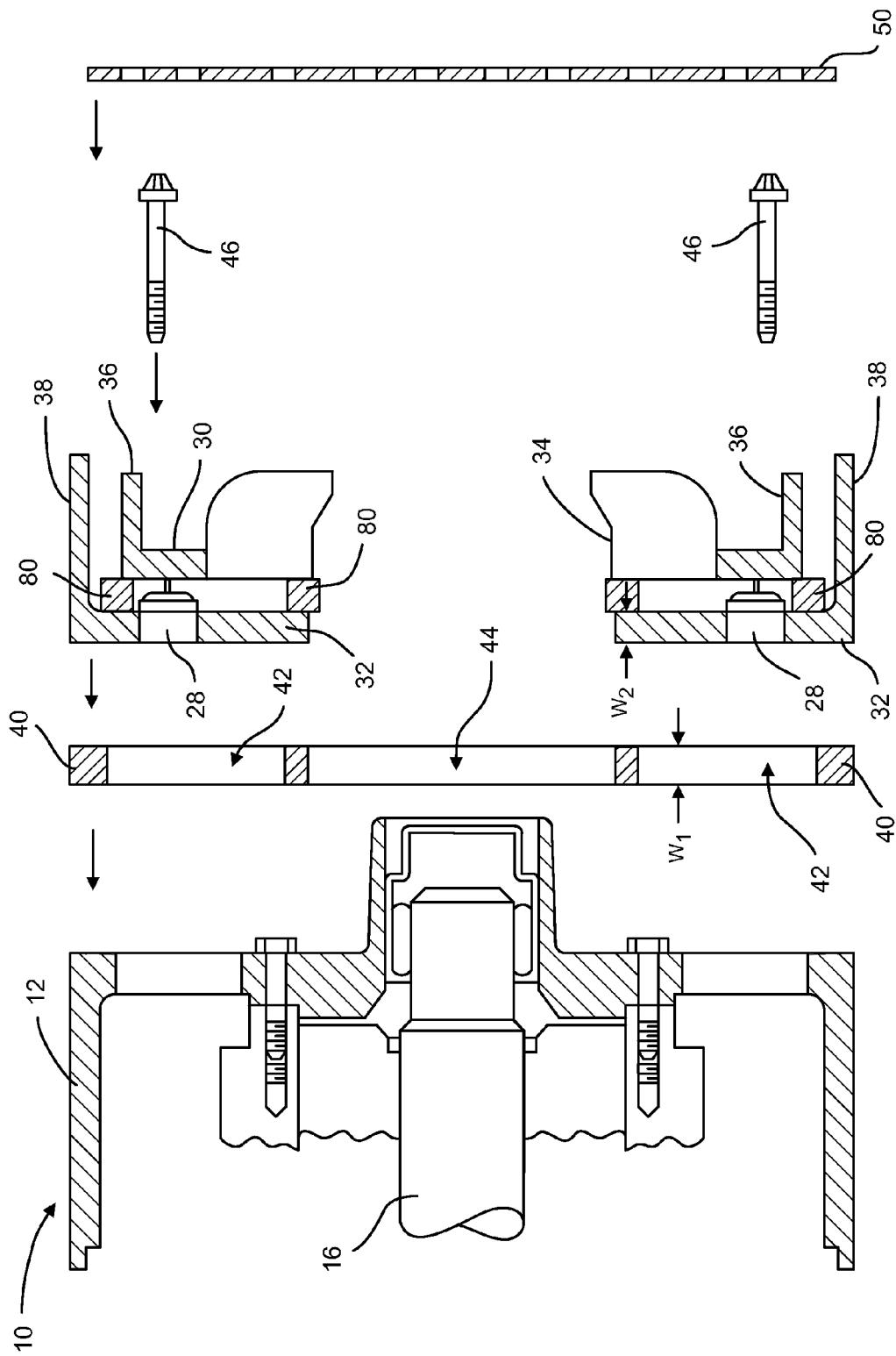
FIG. 2 shows an exploded cross-sectional view of an end portion of the electric machine with isolated ground electronics of FIG. 1.
Figure 3:
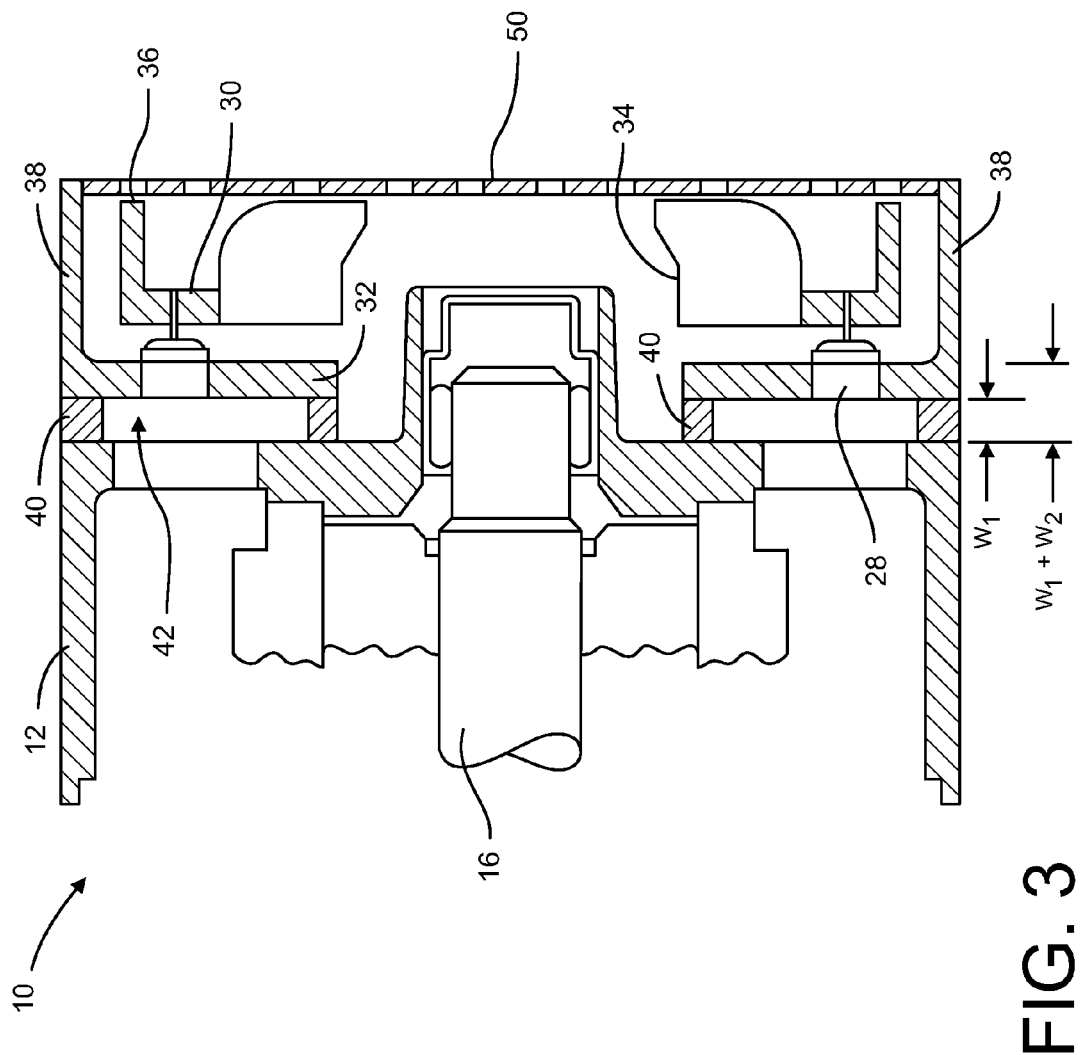
FIG. 3 shows a cross-sectional view of the end portion of the electric machine of FIG. 2 with the components assembled.

With reference to FIGS. 1-3, a dynamoelectric machine for a vehicle 8 is provided in the form of an alternator 10. The alternator 10 comprises a metal frame/housing 12 that contains a rotor 14 and a stator 18. The rotor 14 is positioned on a rotatable shaft 16 and the stator 18 in stationary within the housing 12. An electronics package 20 is mounted on the end of the housing 12. The electronics package 20 is connected to a vehicle battery 22. The electronics package includes a rectifier 24 having a plurality of positive diodes 26 and a plurality of negative diodes 28. The positive diodes 26 are mounted on a positive diode carrier 30, and the negative diodes 28 are mounted on a negative diode carrier 32. As explained in further detail below, the ground/return path between the rectifier and the battery is a dedicated path that is isolated from the alternator housing 12.

FIGS. 2 and 3 generally show the components used to mount the rectifier diodes 26, 28 on the alternator housing 12. An insulative separator 40 is positioned between the end surface of the housing 12 and the negative diode carrier 32. The insulative separator 40 may be comprised of a plastic material or other material that is generally non-conductive with significant electrical insulation properties.

The separator 40 may be provided in any of numerous shapes and sizes. In the embodiment of FIG. 2, the separator 40 has a generally rounded footprint such that the perimeter is circular or arced. The separator 40 includes a number of openings formed therein including a large central opening 44 and a plurality of outer openings 42. The separator 40 is positioned on the alternator housing 12 such that the portion of the housing 12 that retains the end of the rotor shaft 16 extends through the large central opening 44.

The separator 40 has a width $w_1$ (i.e., thickness in the axial direction) sufficient to space the negative diode carrier 32 a safe distance apart from the alternator housing 12 in order to prevent current arcing between the negative diode carrier 32 and the housing 12. At the same time, the separator is sufficiently thin to avoid adding excessive length to the end of the alternator 10. In at least one embodiment, the separator 40 has a width $w_1$ between 4 mm and 10 mm, and particularly about 5 mm. The width $w_1$ may be designed differently, depending on the alternator application and currents passing through vehicle electrical system.

The negative diode carrier 32 is positioned directly adjacent to the separator 40 at the end of the alternator housing 12. The negative diode carrier 32 is designed to conduct current and also act as a heat sink for the negative diodes 28 of the rectifier. Thus, the negative diode carrier 32 is generally comprised of a material having good electrical and thermal conduction properties. For example, the negative diode carrier 32 may be comprised of a material such as aluminum or steel.

The negative diode carrier 32 is designed to fit directly against the separator 40 on the end of the alternator housing 12, and thus the negative diode carrier 32 may have a perimeter that substantially matches that of the separator 40. The negative diode carrier 32 also includes a center hole that allows the carrier 32 to fit over the rotor shaft portion of the housing 12. A plurality of diode holes are formed in the negative diode carrier 32, with each diode hole designed to receive one of the negative diodes 28. The diodes 28 may be retained in the holes of the carrier 32 in any of a number of ways, such as in a friction fit or using an adhesive or epoxy material.

In the embodiment of FIGS. 2 and 3, the negative diode carrier 32 is provided as a metallic plate member that includes outer fins 38 on the perimeter portion of the plate. The fins 38 provide for additional heat transfer qualities, allowing the negative diode carrier 32 to better serve as a heat sink for the negative diodes 28 mounted on the plate. The plate that forms the negative diode carrier 32 has a width $w_2$ (i.e., thickness in the axial direction), as shown in FIGS. 2 and 3. In at least one embodiment, width $w_2$ is between 5 mm and 10 mm, and is particularly about 7 mm.

The positive diode carrier 30 is positioned next to, but separated from, the negative diode carrier 32 on the end of the alternator housing 12. A second insulative separator 80 separates the negative diode carrier 32 from the positive diode carrier 30 at a proper distance. The second insulative separator 80 may be provided as a completely separate component from the carriers 30, 32 or provided by an electrically insulating material fixed to one or both of the carriers 30, 32. In any event, the second insulative separator distances the carriers 30, 32 at a proper distance such that electrical currents on the negative diode carrier 32 remain separated from the currents on the positive diode carrier 30.

The positive diode carrier 30 is designed to conduct current and also act as a heat sink for the positive diodes 26 of the rectifier. Thus, the positive diode carrier 30 is generally comprised of a material having good electrical and thermal conduction properties. For example, the positive diode carrier 30 may be comprised of a material such as aluminum or steel.

The positive diode carrier 30 is designed to fit within the footprint of the negative diode carrier 32, and particularly within the outer fins 36. Thus, the positive diode carrier 30 may have a perimeter that is smaller than but substantially matches that of the negative diode carrier 32. A plurality of diode holes are formed in the positive diode carrier 30, with each diode hole designed to receive one of the positive diodes 26 (not shown in the cross-section of FIGS. 2 and 3). The diodes 26 may be retained in the holes of the carrier 30 in any of a number of ways, such as in a friction fit or using an adhesive or epoxy material.

In the embodiment of FIGS. 2 and 3, the positive diode carrier 30 is provided as a metallic plate member that includes inner fins 34 and outer fins 36 on the perimeter portion of the plate. The fins 34, 36 provide for additional heat transfer qualities, allowing the positive diode carrier 30 to better serve as a heat sink for the positive diodes 26 mounted on the plate.

The positive diode carrier 30, negative diode carrier 32, and insulative separator 40 are all retained on the end of the alternator housing 12 by fasteners 46 that extend through the carriers 30, 32 and separator 40 and into a threaded hole on the alternator housing 12. A non-conductive cover member 50 is positioned over the carriers 30, 32 and provides a covering for the end of the alternator 10 and the associated electronics package 20.

Referring again to FIG. 1, the alternator 10 is positioned in a vehicle 8. The vehicle 8 includes an engine 50 and a battery 22 supported by a vehicle chassis. The word "vehicle" as used herein refers to any device designed to carry or transport something or someone, including, without limitation, cars, trucks, boats, trains and planes. The engine 50 provides a drive torque for moving the vehicle 8. The engine 50 is operably coupled to the rotor 14 of the alternator 10 such that operation of the engine 50 results in rotation of the rotor 14 and its field coil. In particular, when an ignition switch 52 is closed, electrical current from the battery 18 is delivered to a starter motor (not shown). When the starter motor is energized, it cranks the engine 50. When the engine 14 fires, the rotor 14 spins and the alternator 10 generates an output voltage at node 54. The output voltage of the alternator 10 is utilized to electrically charge the battery 22 and is also utilized by other electrical devices of the vehicle 8 as represented by the vehicle load 56.

With continued reference to FIG. 1, the alternator 10 includes the rotor 14, the stator 18, rectifier 24, and a voltage regulator 58. The alternator housing 12 is typically a metal casing, such as a steel casing or a cast aluminum casing. However, it will be recognized that the housing 112 could also be comprised of any other suitable material.

The rotor 14 of the alternator 10 includes a field coil 60 that receives current from the regulator 58 as controlled by the regulator operating a field current control program. The stator 18 includes windings 62 positioned around the rotor 14. The stator 18 generates an output current having a magnitude that is based on the current through the field coil 60. The stator 18 is electrically coupled to the rectifier 24, which delivers the alternator output current at node 54. The rectifier 24 includes the positive diodes 26 and the negative diodes 28. As mentioned previously, the positive diodes 26 are retained by a positive diode carrier 30 and the negative diodes 28 are retained by a negative diode carrier 32 (see FIGS. 2 and 3).

A voltage input (B+ or S) at the regulator 58 provides a signal that is indicative of the voltage at the positive terminal of the battery 22. Based at least in part on this signal, the regulator 58 controls current through the field coil 60, and therefore an associated output voltage and an output current from the alternator 10. The regulator determines the proper field coil current based on the various regulator inputs, which may include, for example, signals from an engine control module (ECM) 70, temperature sensor 72, current sensor 64, ignition switch 52, stator windings, battery 22, and any of various other signals.

Advantageously, in the arrangement of FIGS. 1-3, the negative terminal of the battery 22 is connected to the regulator at node 66 using a ground isolation cable 68 which is shown in the schematic of FIG. 1. By using the isolation cable 68 as the return path for the rectifier 24, disruptive return path current flows are avoided. Furthermore, the rectifier diodes may still be mounted on diode carrier plates 30, 32 which operate as heat sinks for the diodes 26, 28 at the end of the alternator housing 12.

Figure 4:
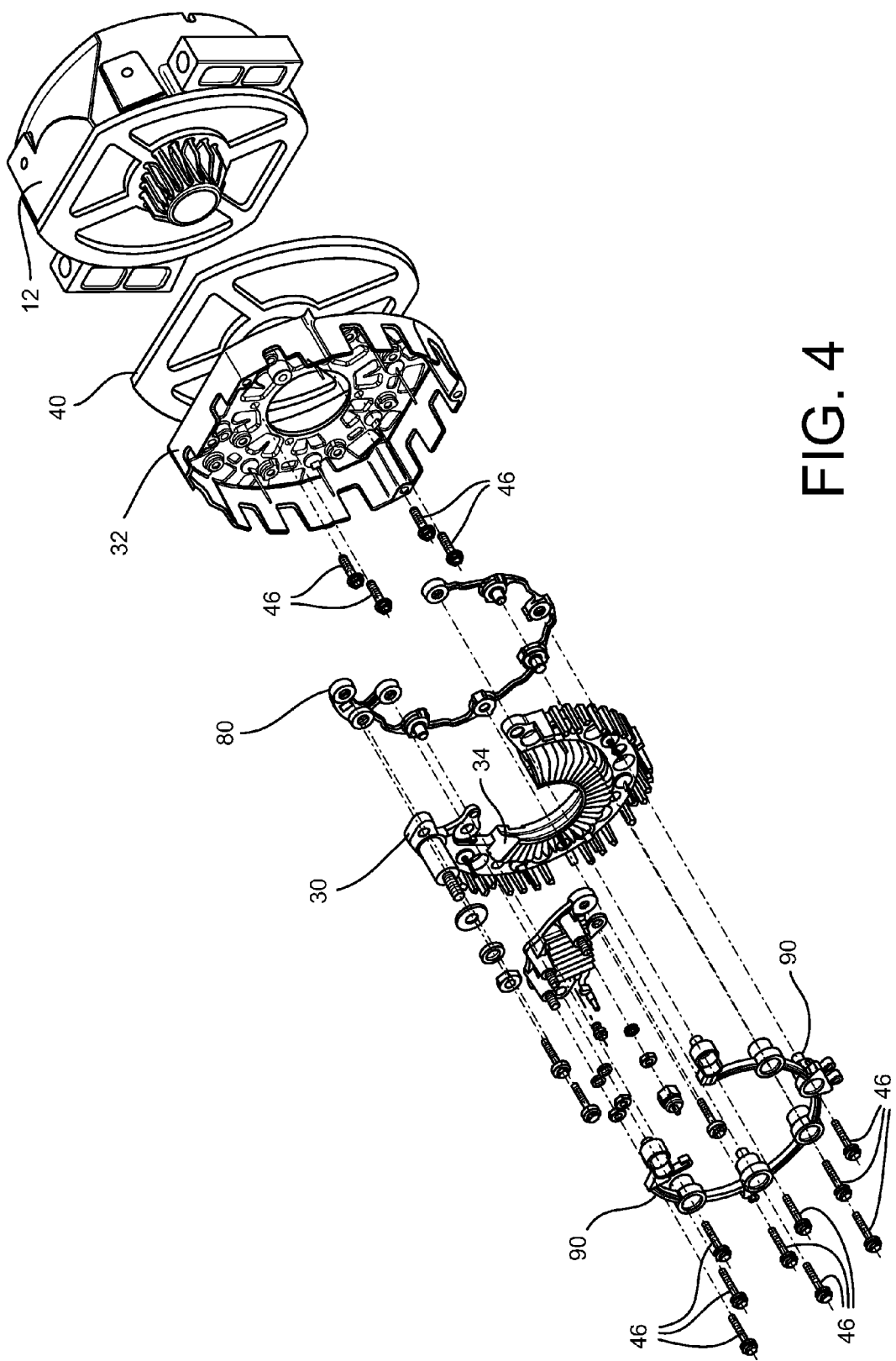
FIG. 4 shows an exploded perspective view of the end portion of the electric machine of FIGS. 2 and 3 where the perspective view is shown from a reverse side of the electric machine.

FIG. 4 shows a more detailed perspective view of the arrangement of FIG. 2 from a reverse side of the alternator. In particular, FIG. 4 shows the end portion of the alternator housing 12 with the insulative separator 40 positioned between the housing 12 and the negative diode carrier 32. The negative diode carrier 32 is bowl-shaped with a saw-toothed outer wall that provides the outer fins 38. A screw hole or other connection point is provided on the surface of the negative diode carrier 32 so the ground isolation cable 68 can be connected to the negative diode carrier 32. The positive diode carrier 30 fits within the bowl portion of the negative diode carrier 32 with the second insulative separator 80 positioned between the negative diode carrier 32 and the positive diode carrier 30. A terminal 90 is positioned adjacent to the positive diode carrier 32 and facilitates proper connection between the positive diodes 26, negative diodes 28 and the leads from the stator windings 62. Fasteners 46 extend through bosses in the diode carriers 30, 32 and are tapped for a bolted connection.

FIGS. 1-3 show but one example of an embodiment of an electric machine with isolated ground electronics as contemplated according to the present disclosure. FIGS. 5-8 show one alternative embodiment of the electric machine. In particular, the embodiment of FIGS. 5-8, is configured for use with an electronics package arrangement similar to that shown in U.S. Pat. No. 6,911,750, issued Jun. 28, 2005 to Bradfield et al., the content of which is incorporated herein by reference in its entirety.

Figure 5:
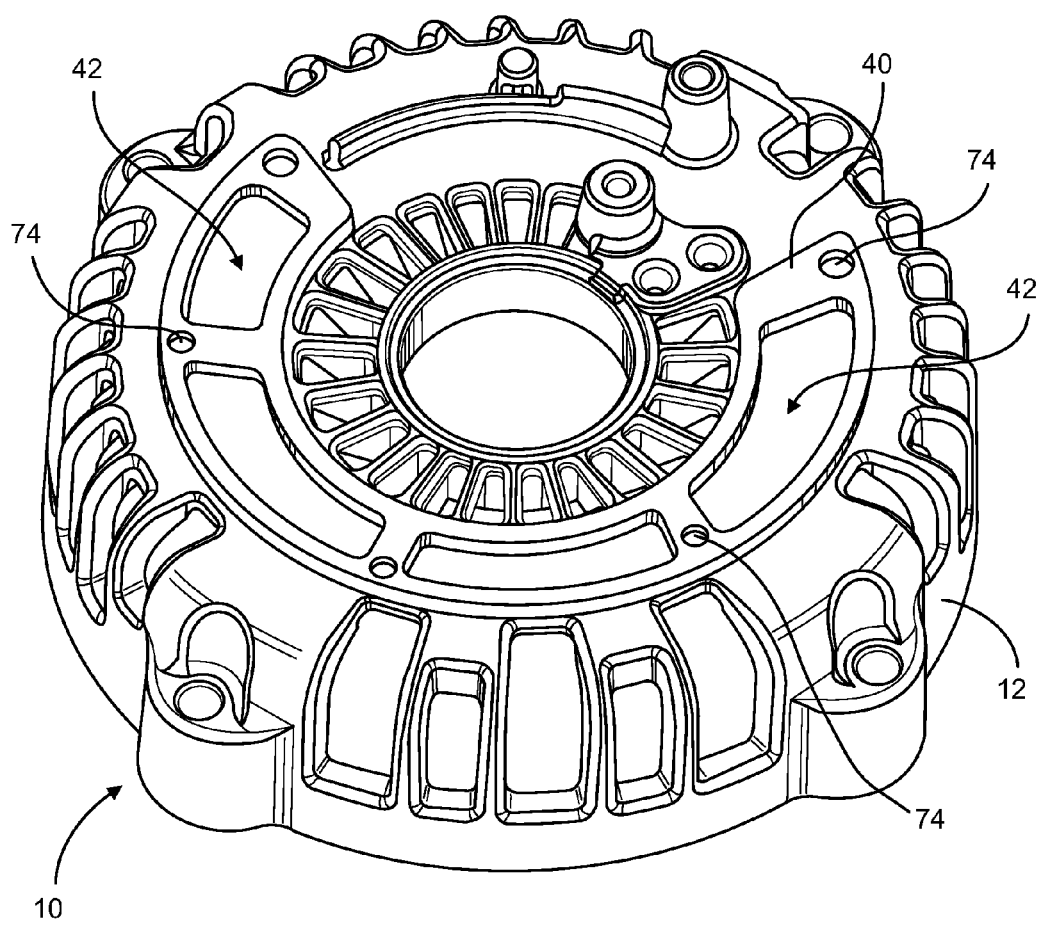
FIG. 5 shows a perspective view of an end portion of an electric machine with an insulative separator positioned thereon in an alternative embodiment of the electric machine of FIG. 2.

With particular reference to FIG. 5, an insulative separator 40 is shown positioned on the housing surface 12 at one end of an alternator 10. The separator 40 is arc shaped with a plurality of openings 42 that expose the underlying surface of the housing 12. The separator 40 also includes a number of holes 74 dimensioned to pass threaded fasteners configured to engage complimentary holes in the housing 12.

Figure 6:
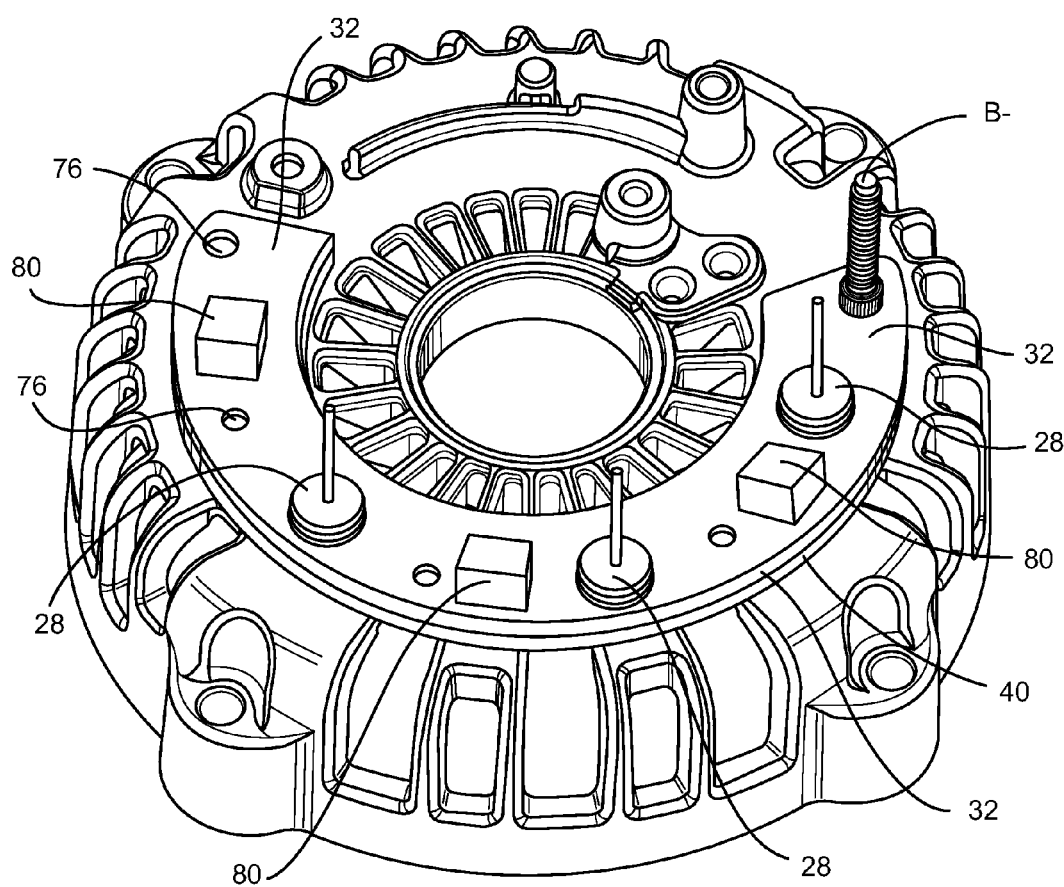
FIG. 6 shows a perspective view of the electric machine of FIG. 5 with a negative diode heat sink positioned adjacent to the insulative separator.

As shown in FIG. 6, a negative diode carrier 32 is positioned on the surface of the insulative separator 40. The negative diode carrier 32 is arc-shaped, similar to the insulative separator 40. A plurality of holes 76 extend through the carrier 32 to allow the fasteners to pass through the carrier 32 and into the housing 12. Three diodes 28 are press-fit into complimentary holes on the surface of the carrier 32. Leads extend upward from the diodes 28. A negative battery terminal B− is positioned on the surface of the carrier and extends away from the carrier 32. The B− terminal is configured for connection to a cable that extends to the negative battery terminal. A plurality of electrical insulation members 80 are also positioned on the surface of the negative diode carrier 32. The insulation members 80 are configured to properly space the positive diode carrier 30 at a proper distance from the negative diode carrier 32.

Figure 7:
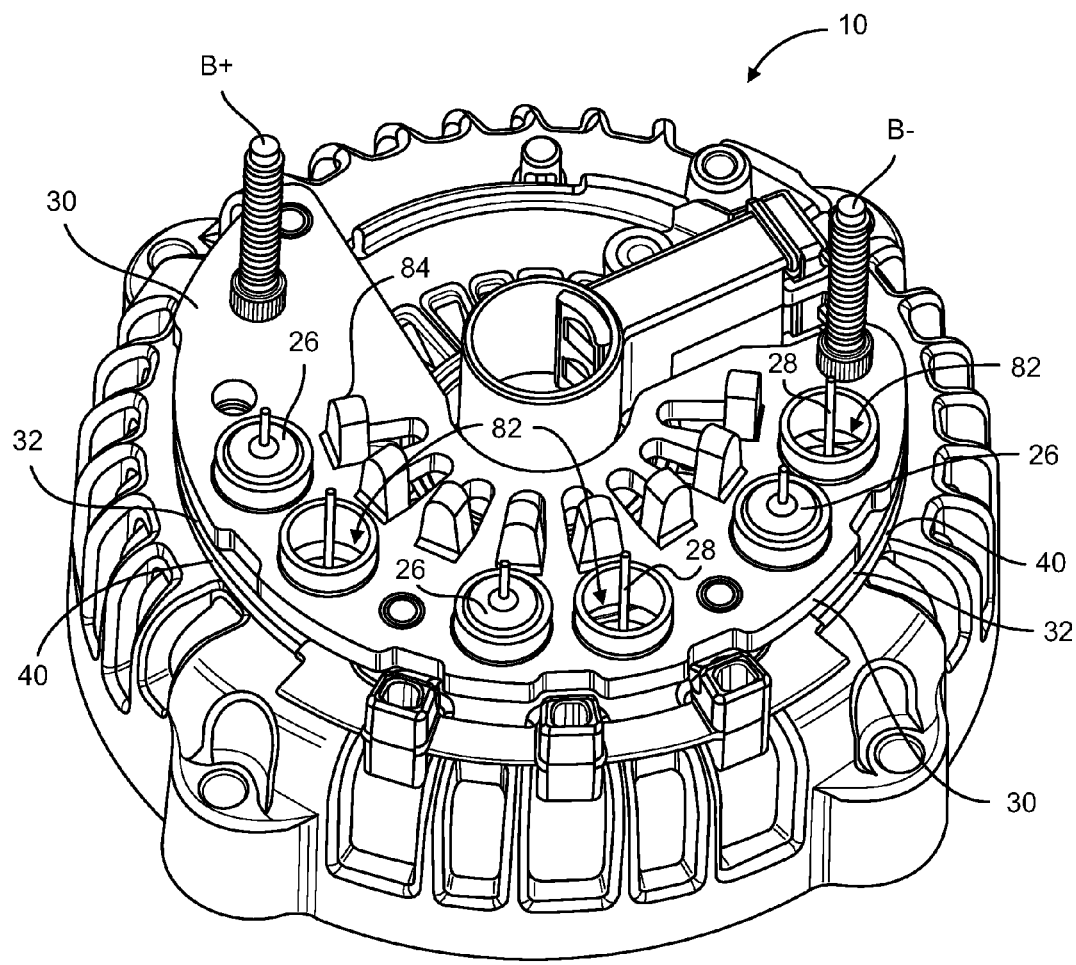
FIG. 7 shows a perspective view of the electric machine of FIG. 6 with a positive diode heat sink positioned next to but electrically separated from the negative diode heat sink.

As shown in FIG. 7, the positive diode carrier 30 is positioned next to the negative diode carrier 30 at the end of the alternator housing 12. The positive diode carrier 30 is similar in shape to the negative carrier 32 and substantially covers the negative carrier 32 at the end of the housing 12. The positive diode carrier 30 includes a number of heat sink fins 84. Three diodes 26 are press-fit into complimentary holes on the surface of the carrier 30. Leads extend upward from the diodes 26. A positive battery terminal B+ is positioned on the surface of the positive diode carrier 30 and extends away from the carrier 30. The B+ terminal is configured for connection to a cable that extends to the positive battery terminal. Furthermore, the positive diode carrier 30 includes holes 82 that allow the leads from the negative diodes 28 to extend through the carrier 30.

Figure 8:
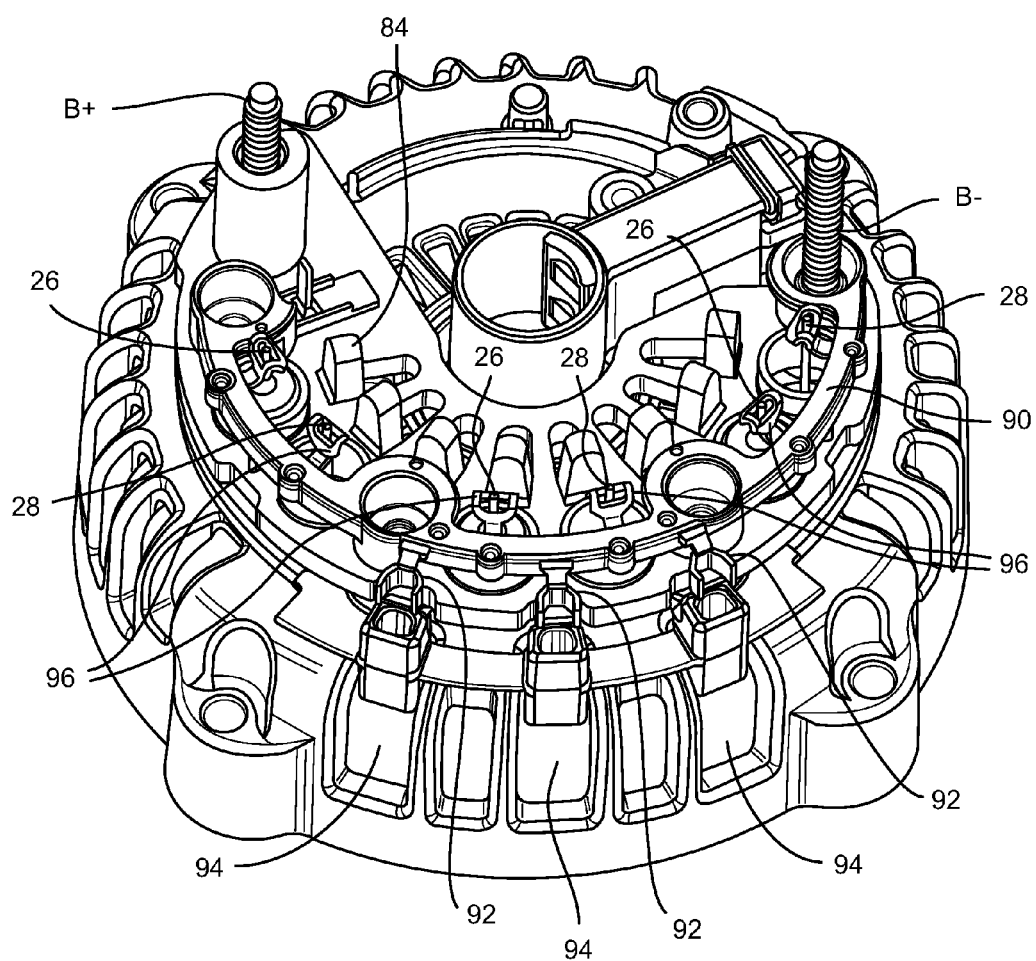
FIG. 8 shows a perspective view of the electric machine of FIG. 7 with a terminal positioned in next to but electrically separated from the positive diode heat sink.

As shown in FIG. 8, a terminal 90 may be used to connect the leads of the diodes 26, 28 to leads from the stator windings 62 (not shown in FIGS. 5-8; see FIG. 1). The leads from the stator windings extend through holes 94 in the alternator housing 12 and are secured to the terminal 90 at the connectors 92. Additional connectors 96 attach the leads of the diodes 26, 28 to the terminal 90. The terminal 90 is electrically separated into three isolated sections, with each section dedicated to one of the three phases from the stator windings 62. Accordingly, the terminal 90 establishes a proper electrical connection, such as that shown in the schematic of FIG. 1, between the stator windings 62 and the rectifier diodes 26, 28.

The arrangement in the embodiment of FIGS. 5-8 provides for an alternator with isolated ground electronics. While the insulative separator 40 and dedicated negative heat sink member add some length to the alternator, the additional length is relatively small, and provides for an alternator that does not take up a substantial amount of space in already crowded engine compartments.

The foregoing detailed description of one or more embodiments of the electric machine with isolated ground electronics has been presented herein by way of example only and not limitation. Moreover, there are advantages to individual advancements described herein that may be obtained without incorporating other aspects described above. Therefore, the spirit and scope of the appended claims should not be limited to the description of the preferred embodiments contained herein.

What is claimed is:

1. An electric machine comprising:
a rotor and a stator positioned within a housing;
a rectifier including a plurality of positive diodes and a plurality of negative diodes;
a first electrically conductive carrier with the negative diodes mounted on the first electrically conductive carrier;
a first terminal connected to the first electrically conductive carrier, the first terminal configured for connection to a ground isolation cable;
an insulative separator positioned between the first electrically conductive carrier and the housing; and
a second electrically conductive carrier with the positive diodes mounted on the second electrically conductive carrier;
a second terminal connected to the second electrically conductive carrier, the second terminal configured for connection to a battery cable.

2. The electric machine of claim 1 wherein the first electrically conductive carrier is provided by a metal plate positioned adjacent to the insulative separator at one end of the housing.

3. The electric machine of claim 1 wherein the insulative separator is comprised of a plastic material.

4. The electric machine of claim 1 wherein the insulative separator is a first insulative separator, and wherein the second electrically conductive carrier is separated from the first electrically conductive separator by a second insulative separator.

5. The electric machine of claim 1 wherein leads from the positive diodes are connected to leads from the negative diodes at a terminal, and leads from the stator are also connected to the terminal.

6. The electric machine of claim 1 wherein the insulative separator is between four mm and seven mm in thickness in an axial direction.

7. The electric machine of claim 6 wherein the first electrically conductive carrier is about 7 mm in thickness in the axial direction.

8. The electric machine of claim 1 further comprising at least one fastener extending through the second electrically conductive carrier, the first electrically conductive carrier, and the insulative separator, and extending into the housing, the at least one fastener configured to fasten the second electrically conductive carrier, the first electrically conductive carrier, and the insulative separator to the housing.

9. The electric machine of claim 1 wherein the first terminal connected to the first electrically conductive carrier is connected to the ground isolation cable and the ground isolation cable extends to a negative battery terminal of a vehicle battery.

10. The electric machine of claim 9 wherein the second terminal connected to the second electrically conductive carrier is connected to a cable that extends to a positive battery terminal of the vehicle battery.

11. A vehicle electrical system comprising:
a dynamoelectric machine including a housing and a rotor defining an axial direction;
a first heat sink;
a first plurality of diodes connected to the first heat sink, wherein the first plurality of diodes are negative diodes of a rectifier;
a first electrical insulation member positioned between the first heat sink and the housing, the first electrical insulation member between four mm and ten mm in thickness in the axial direction;
a second heat sink;
a second plurality of diodes connected to the second heat sink, wherein the second plurality of diodes are positive diodes of the rectifier;
a second electrical insulation member positioned between the first heat sink and the second heat sink.

12. The vehicle electrical system of claim 11 wherein the first heat sink comprises a first metallic plate member and the second heat sink comprises a second metallic plate member.

13. The vehicle electrical system of claim 11 wherein the first electrical insulation member comprises a plastic plate member.

14. The vehicle electrical system of claim 13 wherein the plastic plate member is about 5 mm in thickness in an axial direction.

15. The vehicle electrical system wherein the first plurality of diodes are positioned in holes on the first heat sink.

16. The vehicle electrical system of claim 11 wherein leads from first plurality of diodes are connected to leads from the second plurality of diodes at a terminal member.

17. A vehicle comprising:
an engine;
a battery including a positive terminal and a negative terminal; and
an alternator including
a metal housing,
a rotor positioned within the housing, the rotor configured to rotate upon operation of the engine,
a stator positioned within the housing, and
an electronics package positioned on the housing, the electronics package comprising a regulator and a rectifier, the rectifier including a plurality of negative diodes and a plurality of positive diodes, wherein the plurality of negative diodes are positioned on a first diode carrier that is electrically connected to the negative terminal of the battery by a first cable in the form of a ground isolation cable extending from the negative terminal of the battery to the electronics package, wherein the plurality of positive diodes are positioned on a second diode carrier that is electrically connected to the positive terminal of the battery by a second cable, and wherein the first diode carrier is separated from the housing by an electrical insulation member positioned between the first diode carrier and the housing.

18. The vehicle of claim 17 wherein the electrical insulation member is a first electrical insulation member, and wherein the first diode carrier is separated from the second diode carrier by a second electrical insulation member.

19. The vehicle of claim 17 wherein the leads from the positive diodes are connected to leads from the negative diodes at a terminal member, and wherein leads from the stator are also connected to the terminal member.

* * * * *